Sept. 22, 1936.   A. G. MELDE   2,054,828
CUTTER HEAD AND CUTTER MOUNTING MEANS
Filed July 13, 1934   2 Sheets-Sheet 1
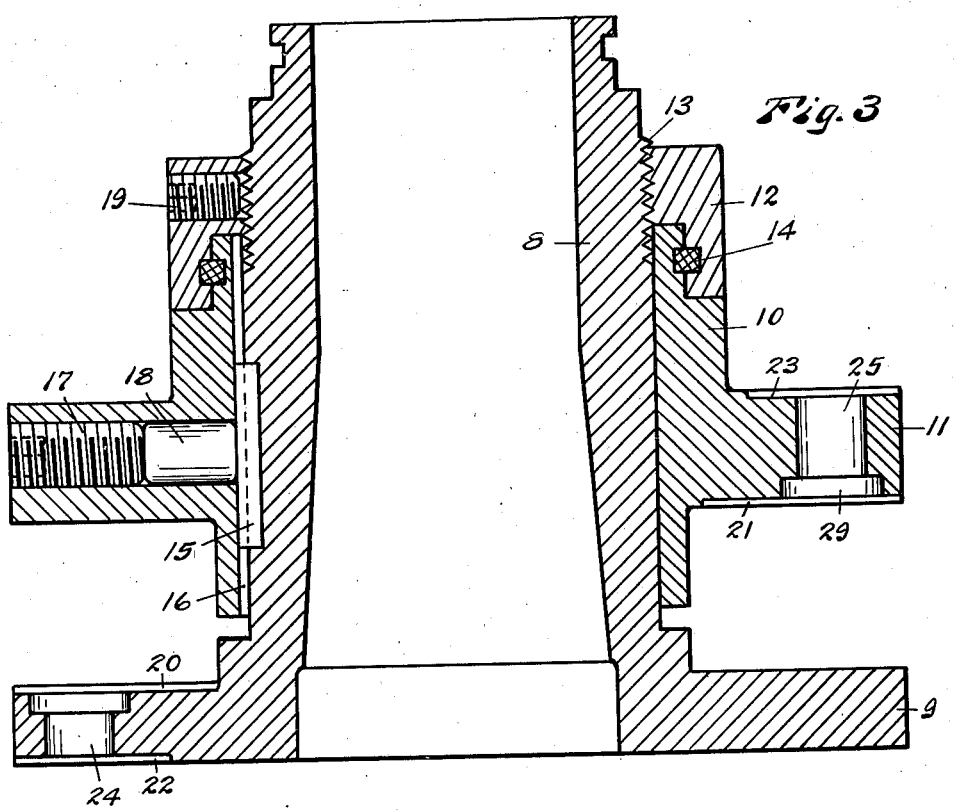
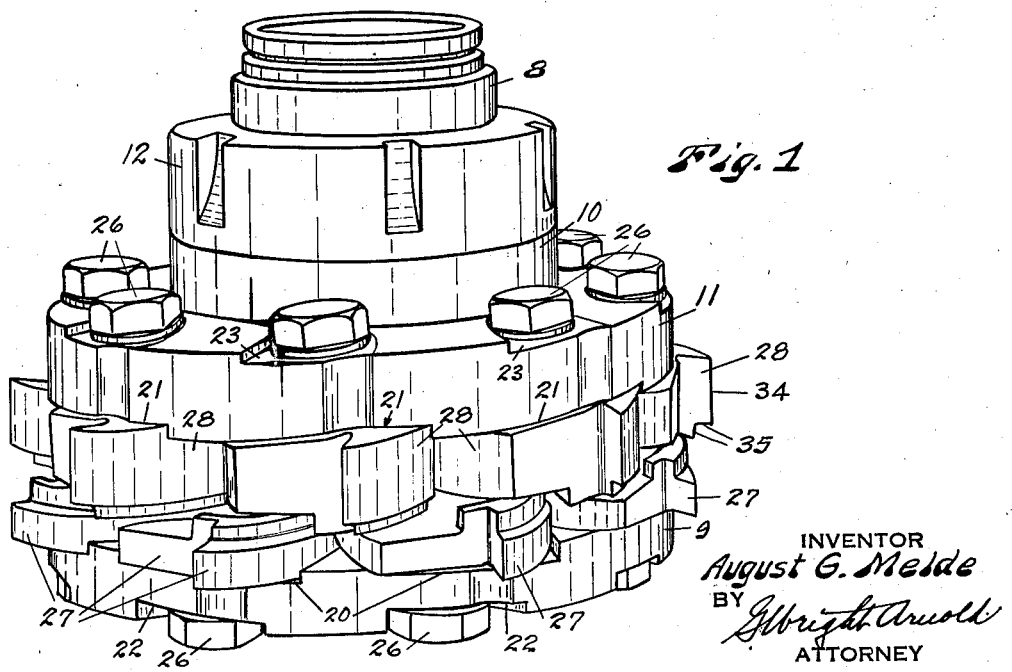
INVENTOR
August G. Melde
BY
Albright Arnold
ATTORNEY Sept. 22, 1936.  A. G. MELDE  2,054,828
CUTTER HEAD AND CUTTER MOUNTING MEANS
Filed July 13, 1934  2 Sheets-Sheet 2
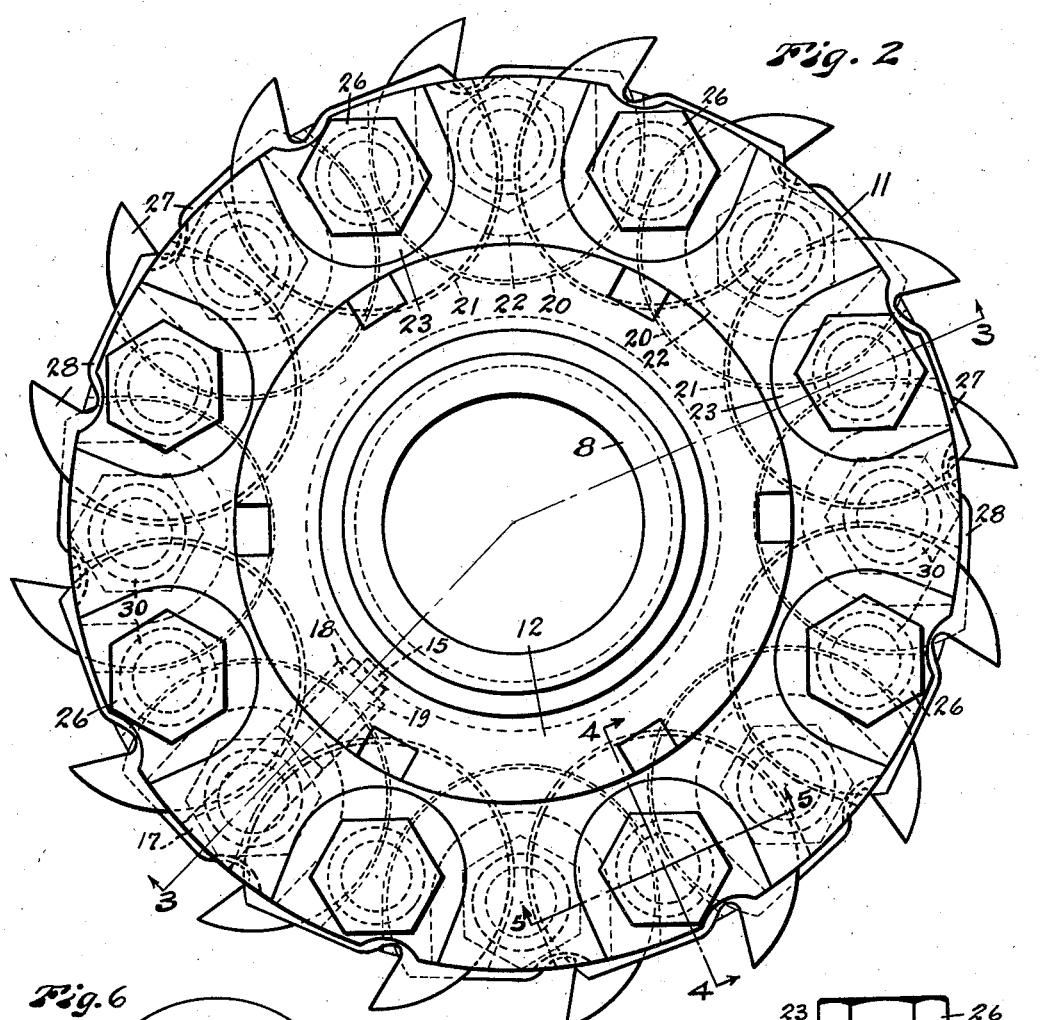
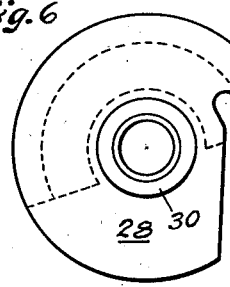
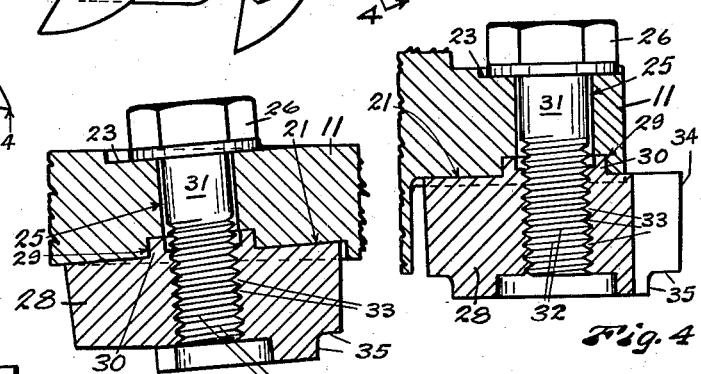
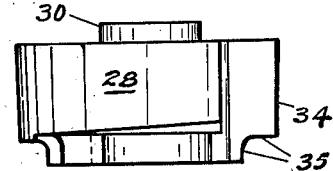
INVENTOR
August G. Melde
BY
Wright Arnold
ATTORNEY Patented Sept. 22, 1936

2,054,828

UNITED STATES PATENT OFFICE 2,054,828

CUTTER HEAD AND CUTTER MOUNTING MEANS

August G. Melde, Seattle, Wash., assignor to Henry Disston & Sons, Inc., Seattle, Wash., a corporation of Washington Application July 13, 1934, Serial No. 735,008

8 Claims. (Cl. 144—234)

My invention relates to cutter heads. More particularly, my invention relates to means for securing the bits or cutters to the respective flanges of an expansion type of cutter head.

A cutter head of the expansion type is provided with two flanges movable toward and away from each other. On each flange is mounted cutters or bits, which bits cooperate to form the particular design cut in the wood, such as, for example, the tongues or grooves on flooring.

In the drawings I have illustrated a cutter head adapted to cut the tongues on flooring. In such work the cutters or bits mounted on one flange will form one-half of the tongue and joint an edge portion adjacent one side of the tongue, while the cutters on the other flange will form the remainder of the tongue and joint the other adjacent edge portion.

In the art of cutter heads, a cutter head of the expansion type, where the jointing of one edge portion and the formation of one-half of a tongue or groove is accomplished by one set of cutters and the formation of the remainder of the tongue or groove and the jointing of the other edge portion by another set of cutters, is well known. Furthermore, regardless of the particular pattern cut on the edges it is well known in the cutter head art, in providing matched lumber, to use such an expansion type of cutter head to divide the work between opposed cutters. By the use of such expansion type of cutter head in providing matched lumber or eased edge finish, the exact size of the tongue, groove, or distance between the eased edges may be at all times regulated by the relative distance between the two flanges of the cutter head.

My invention relates to particular means for securing cutters to flanges of cutter heads, and is particularly adapted to an expansion type of cutter head, where the flanges are adjustable toward and away from each other.

Heretofore in the art, it was common practice to secure the cutters or bits to the respective flanges by the use of bolts and nuts. This practice is objectionable for the reason that the bolt heads, or nuts, require a certain amount of space, and to obtain the proper position between relative cutters, it is necessary to space the cutters apart to provide room between cutters on one flange for the purpose of placing therebetween the nut or bolt head, which holds a cutter on the other flange. Such practice results in limiting the number of cutters available on a cutter head having flanges of any given overall dimension or diameter. It is an object of my invention to overcome this difficulty and increase the number of possible cutters or bits which may be attached to a flange of an expansion type cutter head.

Also in the use of bolts and nuts attaching the cutters or bits to a flange of a cutter head of this type, it was the practice to use cutters substantially semicircular in cross section, thereby limiting the size of the cutters to permit the use of more cutters for a flange of given diameter. This necessarily involved the use of small cutters and necessarily resulted in cutters of a short life, permitting only a limited amount of resharpening before the cutters were worn out. It is an object of my invention to permit a use of a maximum number of cutters on a flange of a given diameter, and at the same time permit the use of relatively large cutters, having a long life and permitting a large number of resharpenings.

Furthermore, in the use of bolts and nuts attaching the cutters to a flange of the cutter head of the type set forth, all of the cutting strain is against the bolts, tending to loosen or shear the bolts and thus loosen the cutters. This results in the cutters shifting and inaccurate work.

It is an object of my invention to minimize the cutting strain on the bolt, and place the same on a boss or hub on the cutters, which is seated in a counterbore or recess in the flange. Furthermore, a flange or boss may be machined to an exact desired size, and this accuracy will be maintained throughout the life of the cutter. Also the recess in the flange may be machined so that the cutter will be maintained in an exact desired position on the flange. By thus positively determining the relative position of the cutters on the flange, and their concentric relation on the revolving cutter head, accurate work may always be readily attained.

In high speed operation, cutter heads may operate at speeds up to 7,200 revolutions per minute. In the event that extremely rough or oversized stock is fed to the cutters, the necessity for securing the cutters immovable on the flange is readily appreciated. I have provided a means for securing the cutters to the flanges, which has great strength and will permit heavy cuts at high speed without effecting the position of the cutters on the flanges.

Furthermore, I have provided a means for securing the cutters on the flanges, so that the cutters may be readily removed for replacement in case of breakage or wear.

Furthermore, by the use of the boss on the cutters and the recess in the flange, I am able to thread the cutters and employ cap screws as securing means and at the same time to positively insure the position of the cutters on the flange, regardless of inaccuracies occurring in the threading of the cap screws or cutters.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a perspective view of an expansion type of cutter head having the cutter secured to the flanges in accordance with my invention;

Fig. 2 is a plan view, on a larger scale, of the cutter head shown in Figure 1;

Fig. 3 is a sectional view substantially on broken line 3—3 of Fig. 2, with the bits or cutters omitted;
Fig. 4 is a fragmentary sectional view of the upper flange and bit attached thereto, substantially on broken line 4—4 of Fig. 2;

Fig. 5 is a fragmentary sectional view of the upper flange and bit attached thereto, substantially on broken line 5—5 of Fig. 2;

Fig. 6 is a detached plan view of bit or cutter; and

Fig. 7 is a detached elevation of the cutter shown in Fig. 6.

The expansion type of cutter head shown in Figs. 1, 2, and 3 comprises a tubular hub member 8, provided on one end with an integral substantially circular flange 9. This hub member 8 is of the type adapted to be attached to a tapered sleeve or spindle. As this said taper sleeve type of connecting means is well known in the art, the details of construction thereof are not herein completely disclosed. Longitudinally movable on the exterior of the hub 8 is a sleeve 10 provided with an integral flange 11 of substantially circular shape and of substantially the same diameter as the flange 9. This sleeve 10 is longitudinally adjustable on the hub 8 by means, many types of which are known to the prior art of expansion cutter heads. The means shown in this instance is in the nature of a nut 12 threaded as by thread means 13 onto the hub member 8 and connected with the sleeve 10 by a lock ring 14. This lock ring 14 may be of soft metal, as babbitt, poured into suitable opposed grooves in the sleeve 10 and nut 12. The pouring of the babbit is preferably done after the sleeve 10 and the nut 12 have been placed in assembled relation with the skirt portion of the nut 12 extending over a portion of smaller diameter at the end of the sleeve. The lock ring 14 permits rotation of nut 12 relative to the sleeve 10. This makes it possible to move the nut 12 on threads 13, and at the same time to move the sleeve 10 and flange 11, thereby varying the distance between the flanges 11 and 9.

Rotation of the sleeve 10 on the hub 8 is prevented by a key or feather 15, which operates within a keyway 16 in the sleeve 10. A set screw 17, threaded into a suitable opening in the flange 11, is adapted to engage and jam a plug 18 against the key 15 to securely lock the sleeve 10 and flange 11 onto the hub 8, thereby preserving the adjustment of the flange 11 relative to the flange 9 and preventing all lost motion between the several parts. In the hereinbefore described expansion type of cutter head, which is well known in the art, I have provided the plug 18, which may be of various lengths, depending upon the diameter of the flange. This permits standard size set screws to be used, and at all times to maintain the set screw 17 flush with the periphery of the flange 11. Another set screw 19 is provided in the nut 12 to jam against threads 13 and securely lock the nut 12 in adjusted position.

The adjacent faces of the flanges 9 and 11 are provided at suitable intervals with inclined portions or surfaces 20 and 21, respectively, against which the flat faces of bits or cutters, hereinafter described, may rest. Other inclined surfaces 22 and 23, respectively, are provided on the outer faces of the flanges 9 and 11 in parallelism with the respective inclined surfaces 20 and 21 to receive the heads of the cap screws which hold the bits. These inclined surfaces are old in the art of cutter heads, and are provided for the purpose of obtaining cutting clearance for the cutters or bits.

The direction of incline of the inclined surfaces clearly appears in the perspective view, Figure 1. Whereas, a section taken on a radial line of the flange, as shown in Fig. 3, indicates a line parallel to the flange.

The flange 9 is provided with suitable holes 24, one of which is shown in Fig. 3, and the flange 11 is provided with similar holes 25. The holes 24 and 25 are spaced at equal radial distances, and are provided at predetermined intervals around said flanges. The holes 24 and 25 serve for the reception of cap screws 26, which secure the cutters or bits 27 and 28 to the flanges.

In the event that the cutter head revolves at a fixed speed, such as 3,600 R. P. M., which is common practice for planers and matchers, on a given cutting circle, such as 7", the number of cutters or bits will determine the rate at which material may be fed to the machine. Many cutting circles are commonly employed. However, the same generally range from approximately 7" to 11". It is an object of my invention to provide means whereby the rate of feed of the stock to the cutter heads may be increased in a given machine by increasing the number of bits which may be employed. By providing means by which the cutter is secured to the flange by cap screws and the cap screws do not extend beyond the cutters, no interference between the cutters on one flange and the cutters on the other flange occurs, permitting the cutters to be placed at frequent intervals on one flange, the number being limited only by the size and particular shape of the cutters themselves.

My invention particularly resides in the securing means shown attaching the cutters to the flanges 9 and 11. Cutters 27 and 28 are similar in all respects, except that they are paired for use on opposed flanges 9 and 11. Referring particularly to Figs. 4 and 5 illustrating cutters 28, a recess or counterbore 29 is provided in flange 11 in connection with hole 25. A boss 30 is provided on cutter 28, interfitting with the recess 29 in flange 11. The hole 25 in flange 11 is preferably somewhat larger than the shank 31 of cap screw 26. Furthermore, the threads 32 of the cap screw 26 are loosely fitted in the threads 33 of the cutter 28. By loosely fitting the shank 31 of the cap screw 26 with the hole 25 of the cutter, there is no tendency of the cutter 28 to be centered by the pull of the cap screw as it is tightened. Also, as the boss 30 is accurately machined to be received by the recess 29, all centering of the cutters is accomplished by reason of said boss and recess. It is preferable to provide a counterbore 29 in hole 25 for purposes of strength, however, as the cap screw fits loosely in hole 25, this hole may be obviously of a diameter sufficient to receive the boss 30 and the counterbore 29 thus eliminated. After the cap screw 26 has been tightened, securing the cutters against the flanges, all cutting thrust, which is substantially in a peripheral direction of the flange, is carried by the boss 30 in the recess 29. Therefore, there is little tendency of the cap screw 26 to loosen, and the relative position of the cutters is maintained, thereby accomplishing a more accurate positioning of the cutters at all times in my attaching means than has been heretofore possible in the art. Furthermore, as the boss 30 and the recess 29 center and position the cutter I am able to loosely fit the threads 32 of the cap screw with threads 33 of the cutter. This has been heretofore impossible because the bolt heretofore used positioned the cutters. This loose fit permits the cap screw 26 to be turned with little tendency of the threads of the cap screw to bind with the threads in the cutter and turn the cutter out of the desired position.

The threads 33 are preferably confined to the cutter and the boss 29 is cut away as shown to facilitate the hardening of the boss in the manufacture of the cutter.

The cutters 27 are secured to flange 9 in a similar manner to the manner described in connection with the securing of the cutters 28 to the flange 11. For this reason the same will not be described in detail.

As illustrated in Figure 1, the cap screws 26 securing the cutters 27 to the flange 9 are paired with the cap screws 26, securing the cutters 28 to the flange 11. In other words, the heads of the cap screws in either instance rest against the outer surfaces 22 and 23, and the cap screws are directed inwardly toward the inner surfaces 20 and 21, respectively.

Referring to Figs. 4 and 5, the cutting face 34 joints one portion of the edge of the stock, while the cutting face 35 forms one-half of the tongue. To vary the size of the tongue, flanges 9 and 11 may be moved relatively away from each other, thus providing a thicker tongue, while flanges 9 and 11 may be moved relatively toward each other, thus providing a thinner tongue. In standard flooring, the size of the tongue is substantially ¼" by ¼". It is, therefore, seen that the space which may be provided between the cutters on the flange 9 and the cutters on the flange 11 is very limited. Therefore, in the art heretofore, where bolts were used having either the head of the bolt or nut between the flanges 9 and 11, it was necessary to space apart the cutters on flange 9 to provide room therebetween for a nut or bolt from the securing means of flange 11 and vice versa.

The cutting face 34 is generally known in the art as a jointing cutter, while the cutting face 35 is generally known in the art as a sizing cutter. By providing a cutter of the type disclosed I provide the same number of jointing cutters as sizing cutters, permitting maximum efficiency. Furthermore, a maximum number of cutters or bits may be used per given diameter, permitting a number of cutters or bits to be used on a given unit, which will bring about the highest degree of efficiency. Furthermore, in my device, as the cutters may be accurately positioned, each cutter will at all times do its desired share of the work, which results in efficient operation, and the cutters may be operated over relatively long periods of time without resharpening.

In the art heretofore, which used bolts and nuts to secure the cutters to the flanges, the fit of the bolt in the cutters and in the flanges determined the position of the cutters on the cutting circle. Whenever the cutters or bits were sharpened or turned, it was necessary for the operator sharpening the cutters or bits to determine that every cutter or bit was on its desired position in the cutting circle. This was an extremely difficult job for an operator with his limited tools on the job. On the other hand, in my device the cutters are centered on the cutting circle by reason of the boss 30 and recess 29, and in the event of sharpening the relative position of the cutters on the cutting circle is not changed, and such accuracy is maintained throughout the life of the cutterhead.

Obviously, changes may be made in the forms, dimensions and arrangement of the parts of my invention, without departing from the principle thereof, the above setting forth only preferred forms of embodiment.

I claim:

1. In a wood working rotating cutter head, a cutter having a face adapted to rest against a support and having a cutting edge disposed transversely of said face; and a cutter positioning and side thrust supporting means comprising a circular boss protruding from said face of said cutter, said circular boss being adapted to be received within a radially positioned recess in the support.

2. In a wood working rotating cutter head, a flange mounted for rotary movement and having a radially positioned circular recess therein; a cutter; a cutter positioning and side thrust resisting circular boss on said cutter adapted to fit within said recess; and securing means connecting said cutter and said flange.

3. In a wood working rotating cutter head, a flange mounted for rotary movement and having a radially positioned hole therein which is counterbored from one side; a cutter; a cutter positioning and side thrust resisting circular boss on said cutter adapted to fit within said counterbore; and securing means connecting said cutter and said flange.

4. In a wood working rotating cutter head, a flange mounted for rotary movement and having a radially positioned hole therein; a cutter; a cutter positioning and side thrust resisting boss on said cutter adapted to fit snugly within said hole, said cutter and said boss having a hole therein and having threads provided in said hole; and a cap screw extending through the hole in said flange and threaded into the threads in the hole in said boss and said cutter and securing said cutter to said flange.

5. In a wood working rotating cutter head, a flange mounted for rotary movement and having a hole therethrough extending in a generally transverse direction, said hole being counterbored from one end to form a circular recess; a cutter; a cutter positioning and side thrust resisting circular boss on said cutter of substantially the same over all dimensions as said recess, whereby said boss will fit snugly within said recess, said cutter and said boss having a hole therein and having threads provided in said hole; and a cap screw extending through the hole in said flange and engaging the threads in the hole in said boss and said cutter, the diameter of the cap screw being less than the diameter of the hole in said flange, whereby a loose fit between the cap screw and the flange is provided.

6. In a wood working rotating cutter head, two spaced apart flanges mounted for rotary movement and having radially positioned holes extending in a generally transverse direction; cutters mounted on adjacent faces of said flanges; cutter positioning and side thrust resisting circular bosses on said cutters fitted into said holes; and securing means connecting said cutters and said flanges.

7. In a wood working rotating cutter head, two spaced apart flanges mounted for rotary movement and having holes extending in a generally transverse direction; cutters mounted on adjacent faces of said flanges; cutter positioning and side thrust resisting circular bosses on said cutters fitted into said holes, said bosses and said cutters having holes aligned with the holes in the flanges and provided with threads; and holding means comprising cap screws extending through the holes in said flanges and screwed into the threads in the holes in said bosses and said cutters, the heads of the cap screws being on the faces of the flanges opposite to the cutters and the other ends of the cap screws not extending beyond the plane of the inner faces of the cutters, thereby leaving the inner faces of the cutters unobstructed, whereby interference between the cutters on one flange and the holding means of the cutters on the opposite flange is avoided and the use of a larger number of cutters on a flange of predetermined over all dimension is made possible.

8. In a wood working rotating cutter head, two spaced apart flanges mounted for rotary movement and having holes in said flanges, said holes being counterbored from the adjacent faces of the flanges to afford recesses; cutters mounted on the adjacent faces of said flanges; cutter positioning and side thrust resisting circular bosses on said cutters fitted into said recesses, said bosses and said cutters having holes aligned with the holes in the flanges and provided with threads; and holding means comprising cap screws extending through the holes in said flanges and screwed into the threads in the holes in said bosses and said cutters, the heads of the cap screws being on the faces of flanges opposite to the cutters and the other end of the cap screws not extending beyond the plane of the inner faces of the cutters, thereby leaving the inner faces of the cutters unobstructed, whereby interference between the cutters on one flange and the holding means of the cutters on the opposite flange is avoided and the use of a larger number of cutters on a flange of predetermined over all dimension is made possible.

AUGUST G. MELDE.